Figure 1:
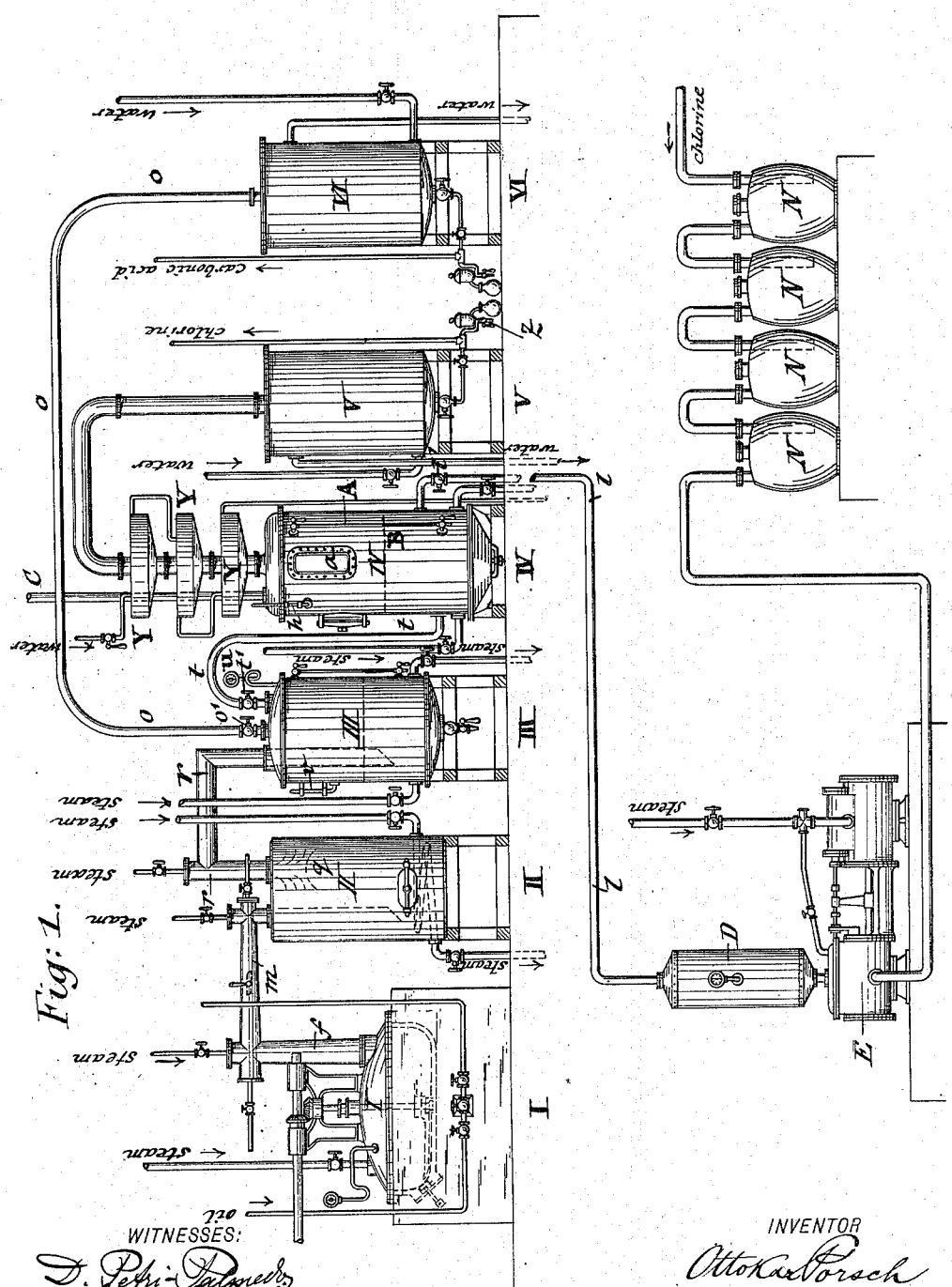

(No Model.)

2 Sheets—Sheet 1.

O. PORSCH.
PROCESS OF MAKING CHLOROFORM AND APPARATUS THEREFOR.

No. 573,483.

Patented Dec. 22, 1896.

WITNESSES:

INVENTOR
Ottokar Porsch
BY
ATTORNEYS.

O. PORSCH.
PROCESS OF MAKING CHLOROFORM AND APPARATUS THEREFOR.
No. 573,483. Patented Dec. 22, 1896.

UNITED STATES PATENT OFFICE.

OTTOKAR PORSCH, OF ORANGEBURG, NEW YORK, ASSIGNOR TO THE ELECTRIC CHEMICAL COMPANY, OF NEW YORK, N. Y.

PROCESS OF MAKING CHLOROFORM AND APPARATUS THEREFOR.

SPECIFICATION forming part of Letters Patent No. 573,483, dated December 22, 1896.

Application filed February 6, 1895. Renewed January 2, 1896. Serial No. 574,156. (No model.)

*To all whom it may concern:*

Be it known that I, OTTOKAR PORSCH, a citizen of the Empire of Austria-Hungary, residing at Orangeburg, in the county of Rockland and State of New York, have invented certain new and useful Improvements in the Manufacture of Chloroform, of which the following is a specification.

Heretofore chloroform was obtained either from pure alcohol or acetone by conducting the same into chlorid of lime or a hypochlorite; but these processes were slow and expensive and required comparatively large quantities of chlorid of lime. Watts, in his *Dictionary of Chemistry*, page 918, Volume I, edition of 1883, says that the manufacture of chloroform from acetone cannot be usefully carried out, not only because the price of acetone is too high, but particularly because acetone yields only about thirty-three per cent. of its own weight of chloroform when it is treated with chlorid of lime. Gustav Rumpf, in his United States Letters Patent No. 383,992, granted June 5, 1888, states that this yield can be considerably increased by conducting pure acetone in a dilute state into a chlorid-of-lime solution while stirring or agitating the solution, so as to promote the formation of chloroform.

I have discovered that chloroform can be made in a continuous and comparatively simple manner by combining the vapors obtained by the dry distillation of a suitable acetate directly with chlorin, dispensing thereby with the use of the inordinately large quantities of chlorid of lime and increasing the yield and quality of the chloroform produced. I have discovered, further, that acetate vapors, which are formed by the dry distillation of acetate of lime, when forced through milk of lime to which chlorin is simultaneously supplied, combine immediately and form chloroform, no change taking place in the reaction even if the process be carried on continuously, and that the yield obtained indicates that all the equivalents of acetic acid in the acetates employed are combined with chlorin and converted into chloroform, so that the cumbrous processes heretofore used for manufacturing chloroform from pure acetone or alcohol by means of chlorid of lime can be entirely dispensed with.

The leading feature of my discovery and of my improved process for the generation of chloroform based on the same consists in the direct conversion of the acetic acid, which is present in the various basic acetates, into chloroform by bringing the vapors resulting from the distillation of an acetate, which are generated by subjecting the latter to high temperatures, directly in the presence of milk of lime into intimate contact with chlorin gas and permitting the reaction to take place in such a manner that all the distillates are converted into chloroform and that not even traces of any unconverted distillates are obtained.

By my improved process the expensive use of large quantities of chlorid of lime, (Rumpf states in his patent before referred to that fifty-eight pounds of acetone require at least six hundred pounds of chlorid of lime,) which was heretofore necessary in the manufacture of chloroform from acetone or alcohol, is dispensed with, while, furthermore, by my process the violent reactions which frequently take place in the manufacture of chloroform from acetone or alcohol by means of chlorid of lime are entirely done away with. I have furthermore discovered that an apparatus can be constructed in which the continuous generation of chloroform can be carried on without removing and replacing the milk of lime, but that by the proper disposition of the supply of the vapors of the distilled acetate and of the chlorin gas into milk of lime a continuous and reciprocal exchange between said vapors and chlorin gas takes place and that by the intimate contact of the vapors resulting from the distillation of an acetate and chlorin gas the combination with the chlorin takes place uniformly and certainly, especially when the supply of said vapors and chlorin gas to the milk of lime is proportioned in such a manner that there is always an excess of chlorin gas in the solution.

Figure 2:
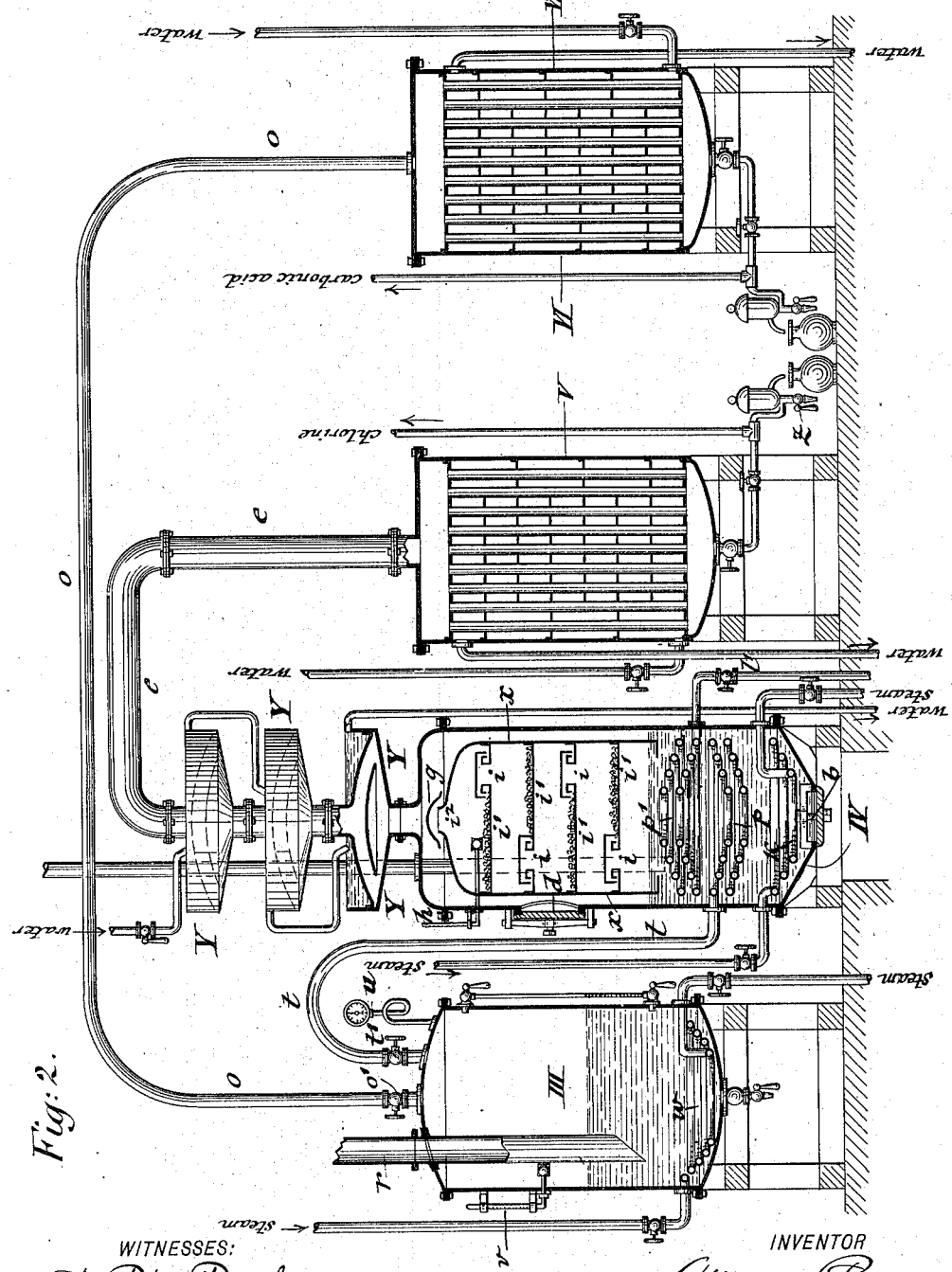

In the accompanying drawings, Figure 1 represents a side elevation of my improved apparatus employed for the commercial manufacture of chloroform from vapors resulting from the distillation of an acetate and chlorin gas; and Fig. 2 is a vertical longitudinal section of the chloroform-generator and of the adjacent vessels connected with the same, drawn on a larger scale.

Similar letters and figures of reference indicate corresponding parts.

The chloroform-generator IV forms the central portion of my improved apparatus, which has at one end the retort I for distilling the acetates, while at the opposite end the pots N are shown, from which the chlorin gas is supplied to the central chloroform-generator. Above the generator IV are arranged three condensing-pans Y, which serve for regulating the temperature in the chloroform-generator at the beginning of the process and also for condensing any vapors resulting from the distillation of an acetate which are not combined with chlorin gas and for returning them into the milk of lime which is charged into the lower part of the chloroform-generator IV. The vapors, which are obtained by dry distillation in the retort I, either from sodium acetate, calcium acetate, or any other acetate, are conducted through the pipes $f m$ into the collecting vessel II, in which the heavier condensable ketones, oils, and other substances mechanically carried over are collected, while the acetate vapors of lower boiling-points are conducted with the condensed steam through the dust-catcher $q$ and pipe $r$ into the vessel III, in which they are purified by being passed through a solution of lime, and then conducted through a pipe $t$, provided with a regulating stop-cock $t'$, to the chloroform-generator IV.

The vessel III is further connected by a second pipe $o$, provided with a regulating stop-cock $o'$, directly with the condenser VI, so that in case the vapors which result from the distillation of an acetate cannot all be utilized in the chloroform-generator IV they can then be conducted into the condenser and condensed in the same into acetone. The fact that all these vapors generated by the still I are not utilized is indicated when the pressure-gage $u$ shows more than ten pounds pressure, said vapors being retained by the steam-coil $w$ in the vessel III at the maximum temperature of 60° Celsius. The condensation of the surplus vapors distilled from the acetate in the still I then takes place entirely independently of the generation of chloroform in the chloroform-generator. The generation of chloroform in the generator IV is regulated by controlling the quantity of vapors, which are supplied by valve $t'$, and of the chlorin gas, which is supplied by the valve $l$. The vapors and chlorin gas are forced into the milk of lime in the chloroform-generator IV through perforated supply-coils $p$ and $p'$, which are located one below the other, the supply of vapors and gas being so regulated that samples drawn off through the testing-cock Z of the condenser V show only traces of hydrochloric acid in the resulting chloroform.

The temperature in the chloroform-generator IV is regulated by a steam-coil K and the thermometer $h$ at the upper part of the condenser IV. The vapors resulting from the distillation of an acetate and the chlorin gas, which enter, respectively, through the perforated supply-coils $p$ and $p'$ into the milk of lime filling the lower part of the generator IV, exchange their respective equivalents of acetone and chlorin and pass then as chloroform-vapors through the circuitous channels $i$ $i$, formed by the trays $i'$ of a cylindrical chamber $x$ at the interior of the generator IV and over layers of amorphous lime on said trays into the counter-current condensing-pans Y. Any hydrochloric acid contained in the chloroform-vapors is condensed and returned into the generator IV, a hood $g$ above the outlet-opening $i^2$ in the upper part of the generator conducting the condensed acid through the annular channel formed between the walls of the chamber $x$ and the generator IV back into the charge of milk of lime in the latter without interfering with the newly-formed chloroform-vapors passing upward through the chamber $x$.

The chloroform-vapors after having passed through the counter-current condensing-pans Y (so-called "Pistorius" condensers) are conducted through a pipe $e$ to the condenser V, from which the condensed liquid chloroform is drawn through the discharge-faucet $z$ into bottles.

A manhole $d$ is arranged for supplying the trays $i'$ with lime, while the milk of lime is charged from a suitable reservoir, located at a higher elevation, through a pipe C into the generator IV, a manhole $b$ at the bottom of the generator IV serving for discharging the milk of lime from the same.

The cloroform-generator IV is provided at diametrically opposite points with glass-covered openings $a$ for observing the regular course of the process, while a gage A indicates the level of the body of milk of lime in the generator. The charge of milk of lime should not rise above the point B, which is about six inches above the uppermost convolution of the chlorin-supply coil $p'$, nor should it fall below this point.

The chlorin gas is supplied from the reservoir D, in which the same is compressed by a pump E and retained at a pressure of ten pounds by means of the valve $l'$ of the chlorin-supply pipe $l$. The supply of the vapors produced by the distillation of an acetate and chlorin gas is so arranged that the former are conducted into the body of milk of lime at the lower part of the same, while the chlorin gas is conducted in an opposite direction thereto at the upper part of the charge. In consequence of the lighter specific gravity of the vapors the same have a tendency to move in upward direction through the milk of lime, so as to meet and mingle intimately with the chlorin gas in the same. The supply of chlorin gas is so regulated in proportion to the supply of vapors obtained from the distillation of an acetate that always a small excess of chlorin gas is present, which can be ascertained from time to time by means of the testing-cock Z. It may be mentioned in this connection that the reservoir, the pump, and the pipe connections for the chlorin gas have to be made either of material capable of resisting the gas, such as earthenware, or to be lined at the inside with a suitable enamel for protecting the inner surfaces of these parts.

The use of melted and pulverized sodium acetate for the dry distillation and generation of the vapors has given the best results, as comparative tests made with equal charges of five hundred pounds each of various acetates, such as acetate of lime, acetate of lead, &c., have clearly demonstrated that sodium acetate yields, in proportion to the effective percentage of acetic-acid hydrate in said salts, not only a greater quantity, but also a purer chloroform than the other acetates employed.

Having thus described my invention, I claim as new and desire to secure by Letters Patent—

1. The art of making chloroform, which consists in mixing chlorin gas in an aqueous bath of an alkaline earth with the vapors resulting from the distillation of an acetate and permitting said gas and vapors to react in said bath and form chloroform.

2. The art of making chloroform which consists in mixing chlorin gas in a heated aqueous bath of an alkaline earth with the vapors resulting from the distillation of an acetate and permitting said vapor and gas to there react and form chloroform.

3. The art of making chloroform which consists in discharging chlorin gas and the vapors resulting from the distillation of an acetate under pressure into an aqueous bath of an alkaline earth and permitting said gas and vapor to there commingle and react and form chloroform.

4. The art of making chloroform which consists in continuously discharging the vapors resulting from the distillation of an acetate and chlorin gas under pressure into an aqueous bath of an alkaline earth subjected to the action of heat and permitting said vapor and gas to continuously commingle and react in said solution in a heated condition and there form chloroform which continuously rises from said bath.

5. The art of making chloroform which consists in discharging the vapors resulting from the distillation of an acetate and chlorin gas in opposite direction to each other into a body of milk of lime and combining them in presence of an excess of chlorin gas into chloroform.

6. The art of making chloroform which consists in conducting the vapors resulting from the distillation of an acetate into a charge of milk of lime at the lower part of the same, introducing chlorin gas in an opposite direction thereto at the upper part of said charge, and combining both in the presence of the milk of lime directly into chloroform.

7. The art of making chloroform which consists in generating vapors by the dry distillation of a suitable acetate, conducting them simultaneously with chlorin gas under pressure into a charge of milk of lime so as to form chloroform, separating the hydrochloric acid from the chloroform-vapors by condensation, and condensing the chloroform-vapors.

8. The art of making chloroform which consists in conducting the vapors resulting from the distillation of an acetate, and chlorin gas under pressure into a charge of milk of lime, heating said charge to the required temperature and combining the vapors and chlorin gas in the charge directly into chloroform.

9. The art of making chloroform, which consists in conducting the vapors resulting from the distillation of an acetate and chlorin gas, under pressure, into a charge of milk of lime, combining them under excess of chlorin gas directly into chloroform, and purifying and condensing the chloroform-vapors.

10. In an apparatus for making chloroform, the combination of a chloroform-generator charged with milk of lime, perforated supply-coils in said generator respectively for the vapors resulting from the distillation of an acetate and chlorin gas, a steam-coil below the supply-coils, a chamber above the coils, provided with trays for lime, and condensing-pans above the generator.

11. In an apparatus for making chloroform, the combination of a chloroform-generator supplied with a charge of milk of lime, perforated supply-coils for the vapors resulting from the distillation of an acetate and chlorin gas respectively, submerged in said charge, a purifier for the vapors connected with the supply-coil, a condenser connected with said purifier for condensing the surplus vapors, and a second condenser connected with the chloroform-generator for condensing the chloroform-vapors.

In testimony that I claim the foregoing as my invention I have signed my name in presence of two subscribing witnesses.

OTTOKAR PORSCH.

Witnesses:
PAUL GOEPEL,
S. E. SMITH.

Correction in Letters Patent No. 573,483.

4

It is hereby certified that the assignee in Letters Patent No. 573,483, granted December 22, 1896, upon the application of Ottokar Porsch, of Orangeburg, New York, for an improvement in "Processes of Making Chloroform and Apparatus Therefor," should have been described and specified as *the Eclectic Chemical Company*, instead of "the Electric Chemical Company"; and that the said Letters Patent should be read with this correction therein that the same may conform to the record of the case in the Patent Office.

Signed, countersigned, and sealed this 29th day of December, A. D., 1896

[SEAL.]

JNO. M. REYNOLDS,
*Assistant Secretary of the Interior.*

Countersigned:
JOHN S. SEYMOUR,
*Commissioner of Patents.*